United States Patent
Niu et al.

(10) Patent No.: US 9,942,479 B2
(45) Date of Patent: Apr. 10, 2018

(54) ELECTRONIC DEVICE AND IMAGING METHOD THEREOF

(71) Applicants: Beijing Lenovo Software Ltd., Haidian District, Beijing (CN); Lenovo (Beijing) Co., Ltd., Haidian District, Beijing (CN)

(72) Inventors: Quan Niu, Beijing (CN); Guang Yang, Beijing (CN); Jinping Yang, Beijing (CN); Ke Shang, Beijing (CN)

(73) Assignees: BEIJING LENOVO SOFTWARE LTD., Beijing (CN); LENOVO (BEIJING) CO., LTD., Beijing (CN)

( * ) Notice: Subject to any disclaimer, the term of this patent is extended or adjusted under 35 U.S.C. 154(b) by 0 days.

(21) Appl. No.: 14/342,119

(22) PCT Filed: Oct. 22, 2012

(86) PCT No.: PCT/CN2012/085055
§ 371 (c)(1),
(2) Date: Feb. 28, 2014

(87) PCT Pub. No.: WO2013/078956
PCT Pub. Date: Jun. 6, 2013

(65) Prior Publication Data
US 2014/0267863 A1    Sep. 18, 2014

(30) Foreign Application Priority Data

Nov. 29, 2011    (CN) .......................... 2011 1 0388459

(51) Int. Cl.
*H04N 5/335*    (2011.01)
*H04N 13/02*    (2006.01)
(Continued)

(52) U.S. Cl.
CPC ......... *H04N 5/23293* (2013.01); *G06F 3/042* (2013.01); *G06F 3/0412* (2013.01);
(Continued)

(58) Field of Classification Search
CPC .......................... H04N 5/23293; H04N 5/374
(Continued)

(56) References Cited

U.S. PATENT DOCUMENTS

| 7,609,310 | B2 | 10/2009 | Miyagawa |
| 8,289,303 | B2 | 10/2012 | Kim |

(Continued)

FOREIGN PATENT DOCUMENTS

| CN | 1574904 A | 2/2005 |
| CN | 1934495 A | 3/2007 |

(Continued)

OTHER PUBLICATIONS

Article, Richter et al.,OLED-on-CMOS based bidrectional microdisplay for near-to-eye and sensor applications, Semiconductor Conference, Dresden, Germany, Sep. 28, 2011, pp. 1-3.*
(Continued)

*Primary Examiner* — Xi Wang
(74) *Attorney, Agent, or Firm* — Brinks Gilson & Lione; G. Peter Nichols

(57) ABSTRACT

An electronic device and an imaging method thereof are described. The electronic device includes at least one display unit and at least one image acquisition unit. The display unit is arranged adjacent to said image acquisition unit. The image acquisition unit is provided with a lens for collecting optical signals and a photosensitive diode unit for converting the optical signals into electrical signals. The lens is arranged in the direction of the incident light of the photosensitive diode unit. The electronic device and the imaging method thereof can implement better imaging effects.

5 Claims, 1 Drawing Sheet

(51) Int. Cl.
*H04N 5/232* (2006.01)
*G06F 3/041* (2006.01)
*G06F 3/042* (2006.01)
*H04N 5/374* (2011.01)

(52) U.S. Cl.
CPC ... *G09G 2360/144* (2013.01); *H04N 5/23212* (2013.01); *H04N 5/335* (2013.01); *H04N 5/374* (2013.01)

(58) Field of Classification Search
USPC .......... 348/246, 297, 308, 211.11, 240.2, 47, 348/211.13; 257/40, 88; 438/34, 29; 345/8
See application file for complete search history.

(56) References Cited

U.S. PATENT DOCUMENTS

| | | | | |
|---|---|---|---|---|
| 8,400,555 | B1* | 3/2013 | Georgiev | H04N 5/23212 348/222.1 |
| 2003/0193600 | A1* | 10/2003 | Kitamura | H04N 5/23212 348/333.01 |
| 2004/0257473 | A1 | 12/2004 | Miyagawa | |
| 2005/0168621 | A1* | 8/2005 | Kageyama | H04N 5/23212 348/349 |
| 2006/0078324 | A1* | 4/2006 | Yasuda | H04N 5/2252 396/299 |
| 2006/0176387 | A1* | 8/2006 | Kobayashi | H04N 5/232 348/333.01 |
| 2006/0262209 | A1* | 11/2006 | Kishi | H04N 5/3532 348/297 |
| 2006/0268431 | A1* | 11/2006 | Jin | G02B 27/646 359/726 |
| 2006/0279652 | A1* | 12/2006 | Yang | H04M 1/0264 348/333.01 |
| 2007/0177860 | A1 | 8/2007 | Hooley | |
| 2007/0216851 | A1* | 9/2007 | Matsumoto | G02F 1/29 349/200 |
| 2008/0031608 | A1* | 2/2008 | Gorzynski | G03B 41/00 396/79 |
| 2008/0143824 | A1* | 6/2008 | Kuroki | H04N 13/02 348/47 |
| 2010/0066812 | A1* | 3/2010 | Kajihara | G02B 3/0056 348/46 |
| 2010/0090998 | A1* | 4/2010 | Kim | G09G 3/3233 345/207 |
| 2010/0234065 | A1* | 9/2010 | Chiu | H04M 1/0227 455/556.1 |
| 2011/0043717 | A1* | 2/2011 | Valyukh | G02F 1/29 349/33 |
| 2011/0221950 | A1* | 9/2011 | Oostra | H04N 5/2257 348/335 |
| 2012/0188452 | A1* | 7/2012 | Keiser | G06T 13/00 348/559 |
| 2013/0021226 | A1* | 1/2013 | Bell | G02B 3/0006 345/8 |

FOREIGN PATENT DOCUMENTS

| | | |
|---|---|---|
| CN | 101554042 A | 10/2009 |
| CN | 101625498 A | 1/2010 |

OTHER PUBLICATIONS

PCT/CN2012/085055 International Preliminary Report on Patentability dated Jun. 3, 2014 (11 pages).
Article, Richter et al., OLED-on-CMOS based bidirectional microdisplay for near-to-eye and sensor applications, Semiconductor Conference, Dresden, Germany, Sep. 28, 2011, pp. 1-3.
PCT/CN2012/085055 International Search Report dated Feb. 28, 2013 (6 pages).
First Office Action dated Jun. 17, 2014 from corresponding Chinese Application No. CN 201110388459.X (14 pages including English translation).

* cited by examiner

ELECTRONIC DEVICE AND IMAGING METHOD THEREOF

This application claims priority to International Application No. PCT/CN2012/085055 filed Nov. 22, 2012; and Chinese Patent Appln. 201110388459.X filed Nov. 29, 2011, the entire contents of each are incorporated herein by reference.

BACKGROUND

The present invention relates to a field of imaging display technology, and specifically to an electronic device and an imaging method thereof.

Human-computer interaction has become a trend of the development of future digital lives. People desire to have a display device, which is able to display an image of an object while acquiring the image of the object.

With the rapid development of Organic Light-Emitting Diode (OLED) technology, there has been presented a bidirectional OLED display device, which includes a display screen. The device is able to acquire the image of an object above the display screen, and display it on the display screen. However, the bidirectional OLED display device in prior art senses light by a Complementary Metal Oxide Semiconductor (CMOS), therefore, it is only possible to sense light within a very small distance and acquire the image of the object closer to the display screen. When the object is far from the display screen, no clear images can be acquired.

SUMMARY

The technical problem that embodiments of the invention are about to resolve is providing an electronic device and an imaging method thereof to implement better imaging effects.

In a first aspect, embodiments of the invention provide an electronic device, including at least one display unit and at least one image acquisition unit, wherein the display unit and the image acquisition unit are arranged adjacent to each other; a lens for acquiring light signal is provided in the image acquisition unit.

Preferably, in the above-described electronic device, the lens is an optical micro-lens, and the at least one display unit includes the optical micro-lens of at least two different types of focal distance.

Preferably, in the above-described electronic device, the focal distance of the lens in the image acquisition unit may be adjusted in accordance to a predetermined condition.

Preferably, in the above-described electronic device, the lens is an adjustable liquid crystal lens formed by nematic liquid crystal, and the adjustable liquid crystal lens in the at least one image acquisition unit are integrated on a film material.

Preferably, in the above-described electronic device, it further includes: a control unit for adjusting the focal distance of the adjustable lens according to a distance between the adjustable lens and the corresponding object to be photographed.

Preferably, in the above-described electronic device, the electronic device is a CMOS-OLED display device including a plural of sub-pixel units, each of which includes one of the display units and one of the image acquisition units. The display unit is an Organic Light-Emitting Diode display unit.

In a second aspect, embodiments of the invention provide an imaging method of an electronic apparatus, the electronic device includes at least one display unit and at least one image acquisition unit, wherein the display unit and the image acquisition unit are arranged adjacent to each other; a lens for acquiring light signal is provided in the image acquisition unit, the method includes: obtaining the light signal acquired by the at least one image acquisition unit; generating an image based on the light signal; displaying the image by the at least one display unit.

Preferably, in the above-described method, the lens is an adjustable liquid crystal lens formed by nematic liquid crystal, and the adjustable liquid crystal lens in the at least one image acquisition unit are integrated on a film material.

Preferably, in the above-described method, before the obtaining the light signal acquired by the at least one image acquisition unit, the method further includes: adjusting the focal distance of the adjustable lens according to a distance between the adjustable lens and the corresponding object to be photographed.

Preferably, in the above-described method, the electronic device is a CMOS-OLED display device including a plural of sub-pixel units, each of which includes one of the display units and one of the image acquisition units. The display unit is an Organic Light-Emitting Diode display unit.

In a third aspect, embodiments of the invention further provide another electronic device, including: a first component including at least one first image acquisition unit in which a first lens for acquiring light signal is provided; a second component including at least one second image acquisition unit in which a second lens for acquiring light signal is provided, and the focal distance of the second lens being able to be adjusted according to a predetermined condition; a first image obtaining unit connected to the first image acquisition unit, for generating a first image of a first object based on the light signal acquired by the first image acquisition unit; an analysis unit, for analyzing the first image and obtaining an analysis result; a control unit, for adjusting the focal distance of the second lens according to the analysis result, so that the second image acquisition unit acquires the corresponding light signal; a second image obtaining unit, for generating a corresponding second image according to the light signal acquired by the second lens.

Preferably, in the electronic device of the third aspect, the second component further includes: at least one second display unit for displaying the second image; the second display unit is arranged adjacent to the second image acquisition unit.

Preferably, in the electronic device of the third aspect, the first object is an eyeball, and the analysis result is a focus point of the eyeball.

Preferably, in the electronic device of the third aspect, the second lens is an adjustable liquid crystal lens formed by nematic liquid crystal, and the adjustable liquid crystal lens in the at least one second image acquisition unit are integrated on a film material.

Preferably, in the electronic device of the third aspect, the first lens is an optical micro-lens, wherein the at least one first image acquisition unit has two or more than two types of the optical micro-lens with different focal distances; or the first lens is an adjustable liquid crystal lens formed by nematic liquid crystal, and the adjustable liquid crystal lens in the at least one first image acquisition unit are integrated on a film material.

In a forth aspect, embodiments of the invention further provide an imaging method of an electronic device, and the electronic device includes: a first component including at least one first image acquisition unit in which a first lens for acquiring light signal is provided; a second component including at least one second image acquisition unit in which a second lens for acquiring light signal is provided, and the focal distance of the second lens being able to be adjusted according to a predetermined condition, and the method includes: generating a first image of a first object based on the light signal acquired by the first image acquisition unit; analyzing the first image and obtaining an analysis result; adjusting the focal distance of the second lens according to the analysis result, so that the second image acquisition unit acquires the corresponding light signal; generating a corresponding second image according to the light signal acquired by the second lens.

Preferably, in the method of the forth aspect, the first object is an eyeball, and the analysis result is a focus point of the eyeball.

Preferably, in the method of the forth aspect, the second component further includes at least one second display unit, the second display unit is arranged adjacent to the second image acquisition unit.

The method of the forth aspect further includes:

displaying the second image by the at least one second display unit.

It can be seen from above, in the electronic device and the imaging method thereof according to the embodiments of the invention, a lens is added in the image acquisition unit, so that it is possible to converge light signal to implement image acquisition of the object with a farther distance to the display panel, and increase the image acquisition distance supported by the CMOS-OLED display device in prior art, and it is possible to obtain better image effects.

DETAILED DESCRIPTION

In order to make the purposes, technical solutions and advantages of the invention more clear, the invention will be specifically described in conjunction with accompanying figures and detail embodiments hereafter.

Embodiment I

The embodiment of the invention provides an electronic device for displaying an image of an object while acquiring the image of the object. The electronic device includes at least one display unit, and at least one image acquisition unit, wherein, the display unit is arranged adjacent to the image acquisition unit, and a lens for acquiring light signal is provided within the image acquisition unit.

Figure 1:
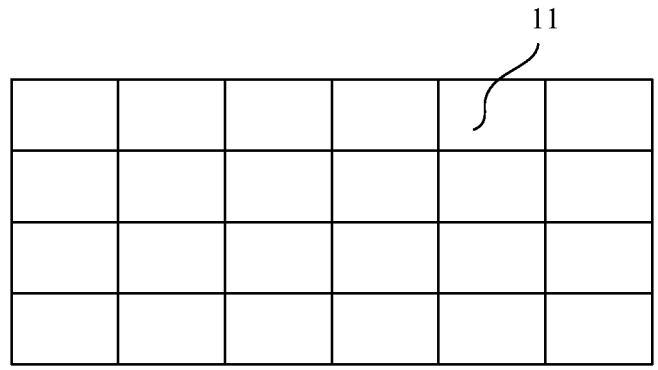
FIG. 1 is an illustrative top view of an electronic device according to embodiments of the invention.
Figure 2:
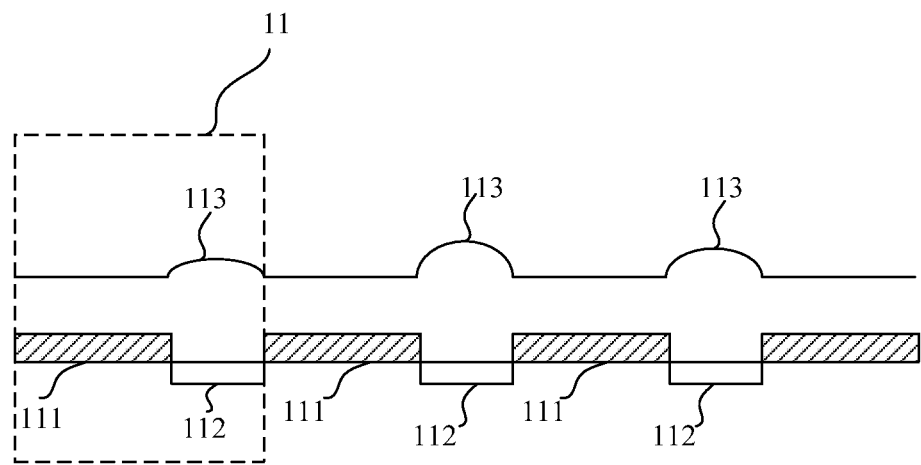
FIG. 2 is an illustrative diagram of a sub-pixel unit of the electronic device according to embodiments of the invention.

In the above-described structure of the embodiment, the electronic device may be specifically a CMOS-OLED display device. Referring to FIG. 1, it shows an illustrative top view of the electronic device 10, and the electronic device includes a display panel on which a plurality of sub-pixel units 1 form. Referring to FIG. 2, each of the sub-pixel units 11 includes one display unit 111 and one image acquisition unit, wherein the image acquisition unit specifically includes a photosensitive diode unit 112 for converting the light signal into electronic signal and a lens 113 provided in the photosensitive diode unit 112 in the incident light direction. The lens 113 is provided within the range of the photosensitive visual angle of the photosensitive diode unit 112, and the incident light reaches the photosensitive diode unit 112 through the lens 113, then the photosensitive diode unit 112 converts the light signal into electronic signal.

Here, the display unit 111 may be an organic light-emitting diode display unit, specifically. In this application, the organic light-emitting diode display unit may be an organic light-emitting layer, specifically. For example, several adjacent display units may formed by arranging red, blue, and green organic light-emitting layers.

Similar to the prior art, the above-described structure of the embodiment may include a image processing unit (not shown in the figure), which is used to generate corresponding image signal according to electronic signal obtained by respective image acquisition units, and control display output signal of respective sub-pixel units, so as to display corresponding images on the display panel.

The embodiment of the invention adopts the above structure of adding a lens to the image acquisition unit, so as to converge light signal to implement image acquisition of the object having a farther distance to the display panel, and increase the image acquisition distance supported by the CMOS-OLED display device in prior art, and it is possible to obtain better image effects.

The above-described lens 113 may be an optical micro-lens (or a group of optical micro-lens). In order to implement image acquisition of various objects with different distances to the lens, the embodiment may adopt two or more than two types of the optical micro-lens of different focal distances, and the micro-lens are provided in various image acquisition units respectively, so that at least two image acquisition units having different focal distances exist. By providing the optical micro-lens with different focal distances, the image acquisition unit is able to acquire images of objects within different ranges, and the object images are further processed by the image processing unit, so that clear images of the objects within different ranges may obtained.

As another preferable implementation mode, in the embodiment, the focal distance of the lens 113 may be adjusted according to a predetermined condition. For example, nematic liquid crystal material is adopted to form an adjustable liquid crystal lens (LensVector), which uses a special control mechanism between transparent ITO electrodes to control molecular structures to vary under the control of electronic field, so as to further control the change of light signal. For example, when the molecular structure varies to the shape of convex lens, it is possible to converge the light signal and to implement a processing such as focusing the light signal. When the electronic filed changes, it may change the molecular structure within the material, so as to implement the effects similar to micro-lens with different focal distances.

When the adjustable liquid crystal lens is adopted, the electronic device of the embodiment may further include: a control unit, for adjusting the focal distance of the adjustable lens according to a distance between the adjustable lens and the corresponding object to be photographed. In the embodiment, the adjustable liquid crystal lens of all image acquisition units may further be integrated on a film material, so as to form an array structure.

Based on the above-described electronic device, the embodiment of the invention further provides an imaging method of the electronic device, the method includes:

Step 21, obtaining the light signal acquired by the at least one image acquisition unit.

Step 22, generating an image based on the light signal.

Herein, the conversion from light signal to electronic signal may be implemented by a photosensitive diode, and the image processing unit generates an image based on the electronic signal.

Step 23, displaying the image by at least one display units to display the image on a display screen formed by the display units.

When the electronic device adopts the adjustable liquid crystal lens, before Step 21, the embodiment may further include: Step 20, adjusting the focal distance of the adjustable lens according to the distance between the adjustable lens and the corresponding object to be photographed.

Embodiment II

The embodiment of the invention further provides another electronic device, the electronic device includes a first component and a second component, wherein the first component may be provided on a first surface of the electronic device, and the second component may be provided on a second surface of the electronic device.

Specifically, the first component includes at least one first image acquisition unit in which a first lens for acquiring light signal is provided. The first image acquisition unit may further include a first photosensitive diode unit for converting light signal into electronic signal. The first lens is provided within the range of the photosensitive visual angle of the first photosensitive diode unit, and the incident light reaches the first photosensitive diode unit through the first lens.

Herein, the first lens may be an optical micro-lens. The at least one first image acquisition unit has two or more than two types of the optical micro-lens of different focal distances. The first lens may further be an adjustable liquid crystal lens formed by nematic liquid crystal, and the adjustable liquid crystal lens in the at least one first image acquisition unit is integrated on a film material.

The second component includes at least one second display unit and at least one second image acquisition unit and the second display unit and the second image acquisition unit are arranged adjacent to each other. A second lens for acquiring light signal is provided in the second image acquisition unit. The second image acquisition unit may further include a second photosensitive diode unit for converting light signal into electronic signal. The second lens is provided within the range of the photosensitive visual angle of the second photosensitive diode unit, and the incident light reaches the second photosensitive diode unit through the second lens. Herein, the focal distance of the second lens may be adjusted according to a predetermined condition. Specifically, the second lens is an adjustable liquid crystal lens formed by nematic liquid crystal, and the adjustable liquid crystal lens in the at least one second image acquisition unit are all integrated on a film material.

The first image acquisition unit is connected to the first image acquisition unit, and for generating a first image of a first object based on the light signal acquired by the first image acquisition unit.

The analysis unit is used to analyze the first image, and obtain an analysis result.

The control unit is used to adjust the focal distance of the second lens according to the analysis result, so that the second image acquisition unit acquires corresponding light signal.

The second image acquisition unit is used to generate a corresponding second image based on the light signal acquired by the second lens, and display the second image by the at least one second display unit.

When the above-described electronic device provided by the embodiment is applied in the area of eye tracing technology, the first object is an eyeball, and the analysis result is a focus point of the eyeball, so that the movement of the eyeball is traced by the first component and the focus point of the eyeball is obtained. Furthermore, based on the acquired information of the focus point, the second lens in the second component is controlled to make the second lens converge at the focus point, so that the light signal of the object at the focus point is better acquired, and a better image of the object corresponding to the focus point is obtained.

Based on the above-described electronic device, the embodiment further provides an imaging method of the electronic device, the method includes:

Step 41, generating a first image of a first object based on the light signal acquired by the first image acquisition unit;

Step 42, analyzing the first image and obtaining an analysis result;

Step 43, adjusting the focal distance of the second lens according to the analysis result, so that the second image acquisition unit acquires the corresponding light signal;

Step 44, generating a corresponding second image according to the light signal acquired by the second lens.

Herein, preferably, the first object is an eyeball, and the analysis result is the focus point of the eyeball.

The second component further includes at least one second display unit. When the second display unit is arranged adjacent to the second image acquisition unit, the above-described method further include following step: step 45, displaying the second image by at least one second display unit.

Many functional components described in the description are called as modules, so that independences thereof are especially emphasized.

In the embodiments of the invention, the modules may be implemented by software as to be executed by various types of processors. As an example, an identified module of executable codes may include one or more physical or logical blocks of computer instructions. For example, it may be constructed as an object, a process, or a function. Despite of this, the identified modules of executable codes may include different instructions stored at different bits, rather than being physically together. When these instructions are logically combined together, they form a module and implement specified purposes of the module.

In practice, the module of executable codes may be one single instruction or multiple instructions, and may be even distributed on several different pieces of codes, on different programs and over several storage devices. As the same, operation data may be identified within the module, and may be implemented as any appropriate forms and organized within any appropriate types of data structures. The operation data may be collected as a set of data, or distributed on different locations (including on different storage devices), and at least may exist on a system or a network only as electronic signal.

While the module is implemented by software, considering the level of hardware process, in the case of not taking cost into account, it is possible for those skilled in the art to implement corresponding hardware circuits to implement corresponding functions of the module implemented by software. The hardware circuits include conventional Very Large Scale Integrated (VLSI) circuits or Gate Arrays, and existing semiconductors such as logic chips, transistors and the like or other separated elements. The module may further be implemented by programmable hardware devices, such as Field Programmable Gate Array, Programmable Array Logic, Programmable Logic Device and the like.

The above is merely embodiments of the invention. It should be noted, it is also possible to make improvements and modifications without departing from the principles of the invention, and these improvements and modifications should also be regarded as the scope of the invention.

The invention claimed is:

1. A CMOS-OLED display device comprising:
a first component provided on a first surface of the display device, including at least one first image collector that comprises one first lens and one first photosensitive diode, the first lens converging a light signal to the first photosensitive diode, the first photosensitive diode converting the light signal into an electronic signal;
a second component provided on a second surface of the display device, including at least one second image collector that comprises one second lens and one second photosensitive diode, the second lens converging a light signal to the second photosensitive diode, the second photosensitive diode converting the light signal into an electronic signal, and a focal distance of the second lens is adjusted according to a predetermined condition;
a processor and a memory that stores a computer program instruction, wherein, when the computer program instruction is run by the processor, functions to be performed include:
generating a first image of a first object based on the light signal acquired by the first image collector, wherein the first object is an eyeball;
analyzing the first image and obtaining an analysis result, wherein the analysis result is a focus point of the eyeball;
adjusting the focal distance of the second lens according to the focus point of the eyeball to make the second lens converge at the focus point, so that the second image collector acquires the corresponding light signal of the object at the focus point; and,
generating a corresponding second image according to the light signal acquired by the second lens
wherein the lens is an adjustable liquid crystal lens formed by nematic liquid crystals, and the adjustable liquid crystal lens in the at least one second image collector is integrated on a film material.

2. The CMOS-OLED display device of claim 1 wherein the second component further includes: at least one second display element for displaying the second image; and the at least one second display element being arranged adjacent to the at least one second image collector.

3. The CMOS-OLED display device of claim 1 wherein the first lens is an optical micro-lens, wherein the at least one first image collector has two or more than two types of the optical micro-lens of different focal distances; or
the first lens is an adjustable liquid crystal lens formed by nematic liquid crystal, and the adjustable liquid crystal lens of the at least one first image collector is integrated on a film material.

4. An imaging method of a CMOS-OLED display device wherein the electronic device includes:
a first component including at least one first image collector in which a first lens for directly acquiring a light signal is provided on a first surface of the display device;
a second component including at least one second image collector in which a second lens for directly acquiring a light signal is provided on a second surface of the electronic device, and a focal distance of the second lens being adjusted according to a predetermined term;
the method includes:
generating a first image of a first object based on the light signal acquired by the first image collector, wherein the first object is an eyeball;
analyzing the first image and obtaining an analysis result, wherein the analysis result is a focus point of the eyeball;
adjusting the focal distance of the second lens according to the focus point of the eyeball to make the second lens converge at the focus point, so that the second image collector acquires the corresponding light signal of the object at the focus point;
generating a corresponding second image according to the light signal acquired by the second lens
wherein the second lens is an adjustable liquid crystal lens formed by nematic liquid crystals, and the adjustable liquid crystal lens in the at least one second image collector is integrated on a film material.

5. The method of claim 3 wherein the second component further includes a least one second display element, and the at least one second display element is arranged adjacent to the at least one second image collector; the method further includes: displaying the second image by the at least one second display element.

* * * * *